(12) United States Patent
Redfern et al.

(10) Patent No.: US 9,009,249 B2
(45) Date of Patent: Apr. 14, 2015

(54) SYSTEMS AND METHODS FOR DELIVERING CONTENT TO A MOBILE DEVICE BASED ON GEO-LOCATION

(71) Applicant: LinkedIn Corporation, Mountain View, CA (US)

(72) Inventors: Joff Redfern, Truckee, CA (US); Jayant Sai, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 184 days.

(21) Appl. No.: 13/689,612

(22) Filed: Nov. 29, 2012

(65) Prior Publication Data

US 2014/0149507 A1    May 29, 2014

Related U.S. Application Data

(63) Continuation of application No. 13/689,487, filed on Nov. 29, 2012.

(51) Int. Cl.

| | |
|---|---|
| G06F 15/16 | (2006.01) |
| G06F 15/173 | (2006.01) |
| H04L 29/06 | (2006.01) |
| H04L 12/58 | (2006.01) |
| H04W 4/02 | (2009.01) |
| H04L 29/08 | (2006.01) |

(52) U.S. Cl.
CPC .......... *H04L 65/00* (2013.01); *H04L 51/32* (2013.01); *H04L 12/588* (2013.01); *H04W 4/02* (2013.01); *H04L 67/22* (2013.01); *H04L 67/18* (2013.01)

(58) Field of Classification Search
CPC ........ H04L 51/32; H04L 12/588; H04W 4/02
USPC .................................................. 709/206, 207
See application file for complete search history.

(56) References Cited

U.S. PATENT DOCUMENTS

| | | | |
|---|---|---|---|
| 7,808,378 B2 * | 10/2010 | Hayden ....................... 340/506 |
| 8,473,500 B2 | 6/2013 | Baluja et al. |
| 2003/0050977 A1 | 3/2003 | Puthenkulam et al. |
| 2007/0124721 A1 * | 5/2007 | Cowing et al. ............... 717/100 |
| 2011/0054780 A1 * | 3/2011 | Dhanani et al. .............. 701/204 |

(Continued)

OTHER PUBLICATIONS

"U.S. Appl. No. 13/689,487, Non Final Office Action mailed Nov. 6, 2014", 12 pgs.

*Primary Examiner* — Hieu Hoang

(74) *Attorney, Agent, or Firm* — Schwegman Lundberg & Woessner, P.A.

(57) ABSTRACT

Described herein are a system and method for delivering content to a mobile computing device, where the content is selected for presentation to a member of a social network service based on the current geo-location of the member (device) and one or more associations and/or relationships between entities represented in a social graph of the social network service. A particular embodiment includes providing, by use of a data processor, a user interface to notify a member of a social network service of his or her proximity to another entity that is represented in the social graph of the social network service. In some embodiments, in response to determining that a member is in geographical proximity of a company that has a presence in the social graph of the social network service, a job recommendation/matching engine may cause information to be presented relating to a job listing posted to a job listing service by an authorized representative of the company.

16 Claims, 9 Drawing Sheets

(56) References Cited

U.S. PATENT DOCUMENTS

| | | | |
|---|---|---|---|
| 2012/0098705 A1* | 4/2012 | Yost et al. | 342/451 |
| 2012/0115501 A1* | 5/2012 | Zheng | 455/456.1 |
| 2012/0135756 A1* | 5/2012 | Rosso et al. | 455/456.3 |
| 2012/0150966 A1* | 6/2012 | Fan et al. | 709/206 |
| 2013/0085861 A1* | 4/2013 | Dunlap | 705/14.58 |
| 2013/0138479 A1 | 5/2013 | Mohan et al. | |
| 2013/0166465 A1 | 6/2013 | Barros et al. | |
| 2013/0166574 A1 | 6/2013 | Kang | |
| 2014/0052861 A1 | 2/2014 | Frind et al. | |

* cited by examiner

SYSTEMS AND METHODS FOR DELIVERING CONTENT TO A MOBILE DEVICE BASED ON GEO-LOCATION

RELATED APPLICATIONS

This application is a continuation of and claims the benefit of priority under 35 U.S.C. §120 to U.S. patent application Ser. No. 13/689,487, filed on Nov. 29, 2012, which is incorporated by reference herein in its entirety.

TECHNICAL FIELD

This patent document pertains generally to tools (systems, apparatuses, methodologies, computer program products, etc.) for allowing electronic devices to share information with each other based in part on a geo-location, and more particularly, but not by way of limitation, to systems and methods for delivering content to mobile devices based at least in part on geo-location.

BACKGROUND

Online or web-based social network services provide their users with a mechanism for defining, and memorializing in a digital format, their relationships with other people. This digital representation of real-world relationships is frequently referred to as a social graph. As these social network services have matured, many of the services have expanded the concept of a social graph to enable users to establish or define relationships or associations with any number of entities and/or objects in much the same way that users define relationships with other people. For instance, with some social network services and/or with some web-based applications that leverage a social graph that is maintained by a third-party social network service, users can indicate a relationship or association with a variety of real-world entities and/or objects. For example, users may take action to expressly indicate a favorable opinion of, or an interest in, different types of content (e.g., web-based articles, blog postings, books, photographs, videos, audio recordings, music, and so forth). Typically, a user's expression of opinion or interest is captured when a user interacts with a particular graphical user interface element, such as a button, which is generally presented in connection with content relating to the particular entity or object and is frequently labelled in some meaningful way (e.g., "like", "+1", "follow").

In addition to hosting a vast amount of social graph data, many social network services maintain a variety of personal information about their members. For instance, with many social network services, when a user registers to become a member, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdate, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the company at which a person is employed, an industry in which a person is employed, a job title or function, an employment history, skills possessed by a person, professional organizations of which a person is a member, online communities or groups of which the person is a member, and so on.

Because social network services maintain vast amounts of social graph and member profile data, companies offering various products and services have naturally gravitated to these social network services with a view to advertising their products and services. Accordingly, social network services offer a variety of ways for companies, schools and other organizations to generate a presence within the social network service. For example, many social network services provide companies with the ability to establish an official presence by generating one or more dedicated company web pages. Similar to how people provide information that makes up a member profile, authorized representatives of a company can provide information to generate a company profile.

BRIEF DESCRIPTION OF THE DRAWINGS

The various embodiments are illustrated by way of example, and not by way of limitation, in the figures of the accompanying drawings in which.

DETAILED DESCRIPTION

Figure 1:
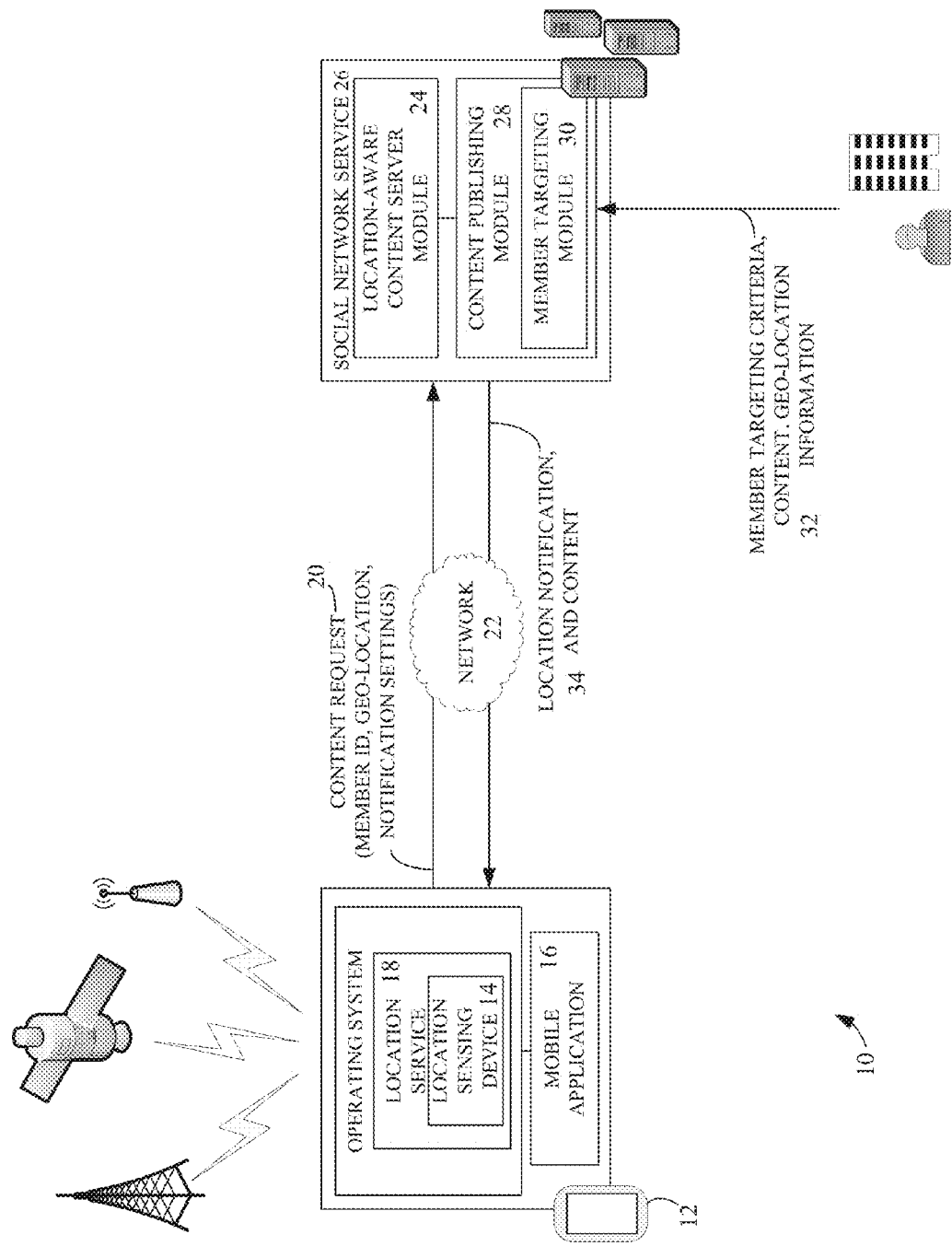
FIG. 1 is a block diagram view of a network environment within which embodiments of the present invention may be implemented.

In the following description, for purposes of explanation, numerous specific details are set forth in order to provide a thorough understanding of the various embodiments. It will be evident, however, to one of ordinary skill in the art that the various embodiments may be practiced without these specific details.

Consistent with some embodiments of the invention, content is communicated to a mobile computing device of a member of a social network service based on that member being physically proximate to a location (e.g., headquarters, campus, store, etc.) of an organization (e.g., a company, school, or other organization) that is represented in a social graph of a social network service. With some embodiments, the content that is communicated to members of the social network service may be selected or specified by an authorized representative of the organization on behalf of which the content is being communicated or published. Furthermore, the authorized representative of the organization may specify various member targeting criteria, such that certain content is only delivered to those members of the social network service who have member profile attributes satisfying the member targeting criteria. In order to receive such content, the members of the social network service use an application residing and executing on a mobile computing device (e.g., mobile phone or handset, tablet computer, personal digital assistant, or any other similar device). With some embodiments, the mobile application includes notification settings that allow the member to specify certain criteria to be satisfied prior to certain content being communicated to, and/or, presented at the mobile computing device.

For example, using a web-based interface of a message or content publishing module, a representative of a company, ACME Products, can select a type of content to be communicated to members of a social network service when a location-aware content distribution module determines those members are near or within some specified geographical location. If the representative for ACME Products is a recruiter, for example, the recruiter may select or specify as the content to be communicated a particular job listing that has been posted to a job listing service hosted at the social network service, or a third-party service. In addition to selecting or specifying the particular content to be communicated, the authorized representative of the company may select member targeting criteria, such that only those members of the social network service having member profile attributes that satisfy the selected member targeting criteria will receive a communication including the specified content.

Continuing with the example of the ACME Products recruiter, the recruiter may specify various member profile attributes as the member targeting criteria for the selected job listing that is to be communicated to members when those members are proximate to a particular campus, building or other location where ACME Products resides. For instance, if ACME Products is located in San Francisco, Calif., and the job listing is for a software engineering position, the recruiter may specify as member targeting criteria a geographical location at which a member resides (e.g., the San Francisco Bay Area), a field of study undertaken by a member (e.g., computer science, or, computer engineering), one or more skills possessed by a member (e.g., Hadoop, Java, C++), a job-seeking classification status of the member (e.g., non-job-seeker, passive job-seeker, or active job-seeker), and so forth. When the location-aware content distribution module determines that a member having member profile attributes that satisfy the specified member targeting criteria is proximate a particular geographical location, for example, as determined by geographical location information received from the member's mobile computing device, the location-aware content distribution module will send the mobile computing device the specified content—in this example, the job listing for the software engineering position at ACME Products.

With some embodiments, the mobile application via which the specified content is presented to the member has notification settings that can be manually adjusted by the member. In some instances, the notification settings are adjustable on the basis of the content type (e.g., job listings, information relating to products and service being offered, promotional offerings, news articles, etc.), and/or entity types (e.g., companies, schools, non-profit organizations, government institutions, and other organizations). For example, with some embodiments, the notification settings allow the member to specify certain criteria relating to a strength of association or connection that must exist between the member and the organization on behalf of which some specified content is being presented, where the strength of association or connection is determined by analyzing one or more connection paths connecting the member with the particular entity in a social graph of the social network service. For example, a member may desire to receive notifications and content only from certain organization to which the member has an association or connection that exceeds some threshold. In one example, a connection strength threshold may be defined by how many employees of a particular organization are also direct connections of the member, or, are being followed by the member. Accordingly, when a member is proximate to a particular location of a company, and otherwise satisfies member targeting criteria specified by an authorized representative of the company, the member may only be presented with a notification and associated content if the member is directly connected to a pre-determined number of other members of the social network service who are also employees of the company. Various other metrics for determining a threshold strength of association and/or connection between a member and another entity represented in the social graph of a social network service are described below. Other advantageous aspects of the present inventive subject matter will be apparent from the description of the figures that follows.

FIG. 1 is a block diagram view of a network environment 10 within which embodiments of the present invention may be implemented. As illustrated in FIG. 1, a mobile computing device 12 includes one or more location sensing devices 14 that use information obtained from a cellular network signal, a Global Positioning System (GPS) signal, and/or a radio signal (e.g., WiFi® or 802.11 compliant signal) to determine an approximate geographical location (or, geo-location) of the mobile computing device. The geo-location of the mobile computing device 12 is then made available to various mobile applications 16 residing and executing at the mobile computing device 12 via an operating system-level service referred to herein simply as a location service 18. For example, the mobile application 16 may make a request of the location service 18 for the current geo-location of the mobile computing device.

Once the geo-location of the mobile computing device 12 is obtained from the location service 18, the mobile application 16 communicates a message or request (e.g., a content request 20) over the network 22 to a location-aware, content server module 24 of the social network service 26. The message or request 20 may include both a member identifier, uniquely identifying the user of the mobile computing device as a member of the social network service 26, and the current geo-location of the mobile computing device 12. In some instances, a process executing in the background of the mobile computing device 12 may communicate the message or request periodically. Alternatively, in some instances, the request might be made in response to an explicit action of the user, such as when the user performs an action to indicate his or her presence at a particular location, frequently referred to as a check-in. With some embodiments, one or more notification settings of the mobile application 16 may also be communicated from the mobile computing device 12 to the social network service 26. Alternatively, with some embodiments, a member's notification settings for the mobile application 16 may be configured and/or stored at an application server, such as might be provided by the social network service 26.

With the information received from the mobile computing device 12, the location-aware content server module 24 will determine whether the mobile computing device 12 is currently proximate to any organization (e.g., company, school, or other organization) that is represented in the social graph of the social network service. If the location-aware content server module 24 determines that the member is proximate with an organization, the location-aware content server module 24 will then determine whether there is any active content to be communicated to the member. In some instances, the operator of the social network service, or an administrator or representative of a particular organization represented in the social graph of the social network service, may specify that certain content is to be communicated to all members of the social network service, or specific targeted members, so long as any notification settings specified by the member are satisfied. Additionally, with some embodiments, when authoring or specifying content to be published, the authorized representative of the organization may establish a duration of time during which the content will be available to be accessed by members of the social network service.

As illustrated in FIG. 1, the social network service 26 includes a content publishing module 28 and a member targeting module 30, which together enable an authorized representative of an organization to author or specify content to be published, such that, the content is associated with one or more geo-locations. In addition, the content can be associated with member targeting criteria. Consequently, when the content is published, the published content will be accessible only to those members of the social network service that have member profile attributes satisfying the specified member targeting criteria, and only when those member's proximate to the specified location.

For example, an authorized representative of a company may use the content publishing module 28 of the social network service 26 to publish a building or campus map, along with information about where to park when visiting the building or campus, where to register or check in, information required for accessing certain resources such as a WiFi® guest network, or similar computer and network resources, and so forth. Consequently, when a member of the social network service arrives at a particular location, a notification 34 may appear on his or her mobile computing device 12 to notify the member of the content available as a result of the member being at the location. As such, any member of the social network service who may have a meeting with employees of the company at a particular location will be able to view a building or campus map, along with information relevant to their visit at the building or campus. Moreover, this content or information 34 will be automatically presented via the mobile application 16 of the member's mobile computing device when the member arrives at the particular location. If the content is being published in the context of an event that is to occur (e.g., such as a conference, a seminar, a meeting, etc.), the representative of the company who is publishing the content may specify the duration of time during which the content will be accessible to members of the social network service. As such, when members of the social network service arrive at the particular location, this information can be automatically presented to the members of the social network service, via their mobile computing devices, based on their presence at the location specified by the authorized member of the company.

With some embodiments, certain content may be presented to members of the social network service based solely on the members' geo-location and optionally, notification settings of the mobile application 16 as established by the members. However, with some embodiments, the content publishing module 28 of the social network service provides a member targeting module 30 that allows authorized representatives of an organization represented in the social graph of the social network service to specifically author content and/or select content to be communicated to a particular target audience. Accordingly, in some instances, when the location-aware content server module 24 determines that a particular member is proximate with a particular location of an organization represented in the social graph of the social network service, the location-aware content server module 24 will determine whether the member, identified by the member identifier received with the content request 20, has member profile attributes that satisfy the member targeting criteria 32 specified by the representative of the organization and associated with a particular selection of content. When the member does have member profile attributes satisfying the specified member targeting criteria, the associated content is communicated to the mobile computing device 12 of the member, so long as any notification settings established by the member for the particular type of content are also satisfied.

Figure 2:
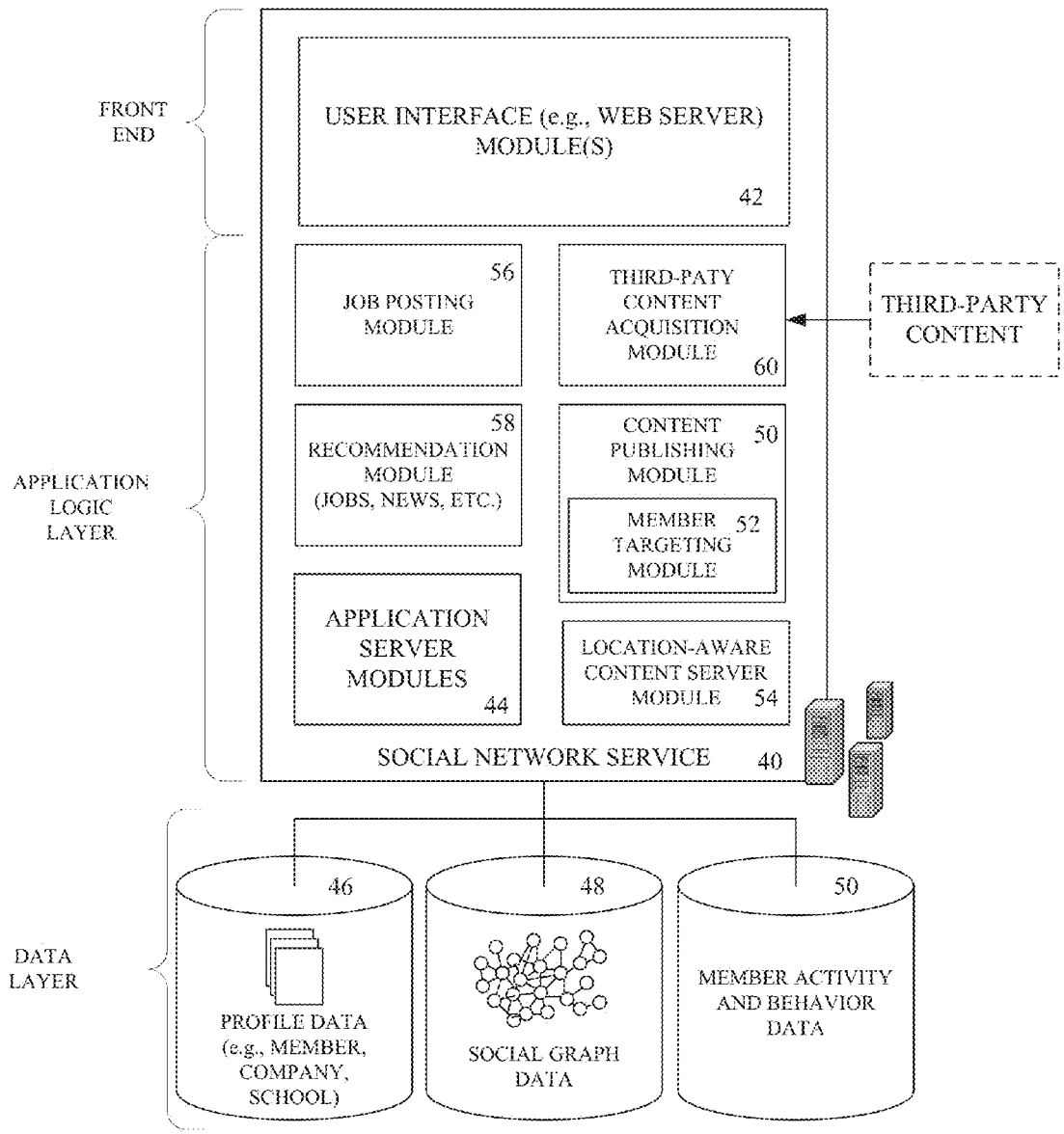
FIG. 2 is a block diagram illustrating the functional components of a system for delivering content, based at least in part on the geo-location of a member of a social network service, consistent with some embodiments.

FIG. 2 is a block diagram illustrating various components or functional modules of a social network service 40, consistent with some embodiments. As shown in FIG. 2, the front end consists of a user interface module (e.g., a web server) 42, which receives requests from various client-computing devices, and communicates appropriate responses to the requesting client devices. For example, the user interface module(s) 42 may receive requests in the form of Hypertext Transport Protocol (HTTP) requests, or other web-based, application programming interface (API) requests. The application logic layer includes various application server modules 44, which, in conjunction with the user interface module(s) 42, generates various user interfaces (e.g., web pages) with data retrieved from various data sources in the data layer. With some embodiments, individual application server modules 44 are used to implement the functionality associated with various applications, services and features of the social network service. For instance, the ability of an organization to establish a presence in the social graph of the social network service, including the ability to establish a customized web page (e.g., a company page, or a product/service page) on behalf of an organization, and to publish content, messages and/or status updates on behalf of the organization, may be services implemented in independent application server modules 44. Similarly, a variety of other applications or services that are made available to members of the social network service will be embodied in their own application server modules 44.

As shown in FIG. 2, the data layer includes several databases, such as a database 46 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 46. Similarly, when a representative of an organization initially registers the organization with the social network service, the representative may be prompted to provide certain information about the organization. This information may be stored, for example, in the database with reference number 46, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 2 with reference number 48.

The social network service 40 may provide a broad range of other applications and services that allow members the opportunity to share and receive information, often customized to the interests of the member. For example, with some embodiments, the social network service 40 may include a photo sharing application that allows members to upload and share photos with other members. With some embodiments, members may be able to self-organize into groups, or interest groups, organized around a subject matter or topic of interest. With some embodiments, the social network service 40 may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 2 by the database with reference number 50. This information may be used to classify the member as being in various categories. For example, if the member performs frequent searches of job listings, thereby exhibiting behavior indicating that the member is a likely an active job-seeker, this information can be used to classify the member as an active job-seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts. Techniques for assigning a job-seeker score or classification to members of a social network service are described more completely in U.S. patent application Ser. No. 13/682,033, filed on Nov. 20, 2012, with title, "Techniques for Quantifying the Job-Seeking Propensity of Members of a Social Network Service," which is hereby incorporated herein by way of reference.

With some embodiments, the social network service 40 includes what is generally referred to herein as a content publishing module 52, with a member targeting module 54. The content publishing module 50 enables an authorized representative of an organization represented in the social graph of the social network service to author, or otherwise specify or select content of various content types to be communicated to members of the social network service. The particular communication channels may vary. For example, the content publishing module 50 may enable messages to be presented in an activity stream of a member. In addition, the content publishing module 50 enables notifications and content to be presented via a mobile application, when published by a location-aware content server module 54, such as illustrated and described in connection with FIG. 1.

The member targeting module 52 enables an authorized representative of an organization to specify a set of recipients to receive a message, notification or some other content. In particular, an authorized representative of an organization can target members to receive content by selecting various member profile attributes (e.g., members residing in a particular location, city or state; members who are employed in a particular industry, and who have a particular job title; members who, based on analysis of their interactions with applications, content and services, their profile data, and social graph data, have a high propensity to be job-seekers, and so forth). Accordingly, a representative of an organization can tailor a message, and/or author or select specific content (e.g., a job listing) to be suitable for a particular subset of members of a social network service. Because the content can be tailored to the selected audience, the selected audience is more likely to find the content to be of interest and the overall level of engagement is increased.

With some embodiments, the authorized representative of the company can tailor the message to a member audience based on the members having previously expressed some specific interest with respect to a particular product or service, for example, by having interacted with a particular member-interest button presented in connection with content (e.g., a published message) relating to the specific product or service. Accordingly, consistent with some embodiments, a member's previous selection or interaction with a member-interest button presented in association with a message or status update relating to a particular product or service of a company can be used as targeting criteria with the member targeting logic 52. With some embodiments, when an authorized representative is preparing to publish a message, the author can select certain member-targeting criteria that will cause the message to be published to select members, such as those members who previously selected a particular member-interest button. A more complete description of various techniques for how a member-interest button or user interface element might be used as the basis for targeting members of a social network service to receive specific content is described in U.S. patent application Ser. No. 13/672,515, filed on Nov. 8, 2012, with title, "Generating Leads for Products and Services via an Activity Stream," which is hereby incorporated herein by way of reference.

Although not shown, with some embodiments, the social network service 40 provides an application programming interface (API) module via which third-party applications can access various services and data provided by the social network service 40. For example, using an API, a third-party application may provide a user interface and logic that enables an authorized representative of an organization to author or specify some content of a particular type, such that the content can be published and accessible to members of the social network service. Such third-party applications may be browser-based applications, or may be operating system-specific. In particular, some third-party applications may reside and execute on one or more mobile devices (e.g., phone, or tablet computing devices) having a mobile operating system.

As shown in FIG. 2, the social network service 40 includes a job posting module 56 that enables individuals, companies, or other organizations to post job listings to a job listing service. As such, members of the social network service 40 can search for, and browse, job listings of interest. In addition, a recommendation engine 58 may analyze various job listings and select the job listings that are most likely to be of interest to a particular member, based on that member's member profile attributes. Accordingly, a job recommendation application may communicate the highest ranking job listings for a particular member to that particular member. With some embodiments, when listing a job via the job posting module 56, an authorized representative of a company can create content for distribution via the location-aware content server module 54. Specifically, the representative may specify member targeting criteria, one or more geo-locations, and optionally, some other content, such that when members of the social network service having member profile attributes that satisfy the specified member targeting criteria are determined to be in a specified geo-location, a notification will be communicated to the mobile application executing on the mobile computing device of the member. The notification may, for example, notify the member of the job listing that is associated with the organization in the particular geographical location.

With some embodiments, the social network service 60 may include a third-party content acquisition module 60 for acquiring or obtaining content hosted at content servers of third parties. Subsequent to being obtained, such content might be specified or selected for presentation to members, for example, via the location-aware content server module 54.

Generally, a social graph maintained by a social network service includes data identifying or otherwise indicating the associations, connections and/or relationships that individual members have with other members, and other entities (e.g., companies, schools, etc.) represented in the social graph. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities. Although other techniques may be used, with some embodiments the social graph data structure is implemented with a special type of database known as a graph database. Accordingly, if a member is employed at a particular company, this particular association will be reflected in the social graph. Similarly, when a member joins a particular online group hosted by the social network service, or hosted by a third-party service provider, the member's membership in the group may be reflected in the social graph data.

Figure 3:
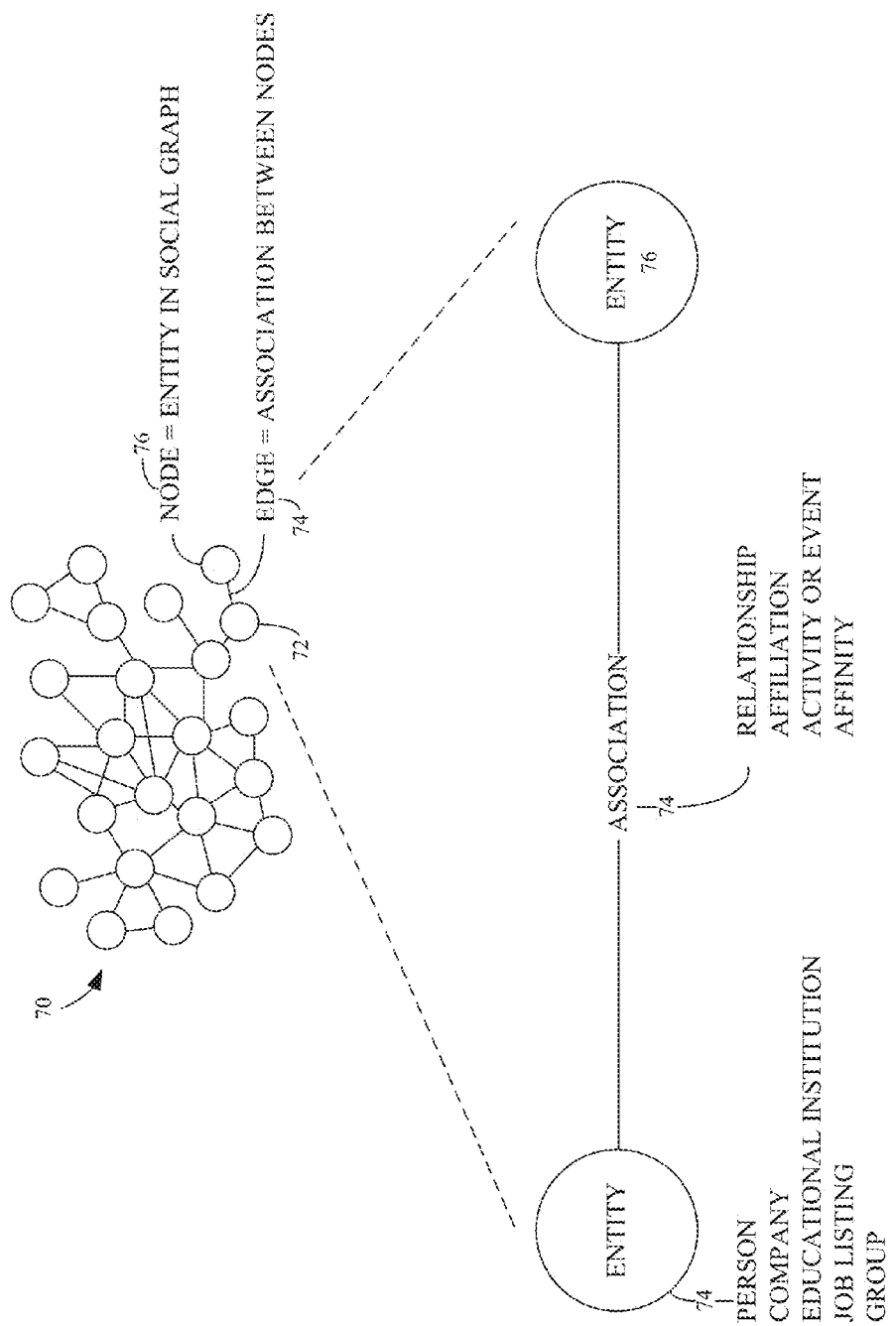
FIG. 3 is a diagram illustrating a model of a multi-entity social graph maintained by a social network service, consistent with some embodiments of the present invention.

FIG. 3 is a block diagram illustrating an example of a portion of a graph data structure 70 for implementing a social graph, according to some embodiments of the invention. As illustrated in FIG. 3, the graph data structure 70 consists of nodes connected by edges. For instance, the node with reference number 72 is connected to the node with reference number 76 by means of the edge with reference number 74. Each node in the graph data structure represents an entity in the social graph. With some embodiments, any number of entity types may be included in the social graph. For example, as illustrated in FIG. 3, the entity types that exist in one implementation of a social graph that is consistent with an embodiment of the invention are: a person, a company, an educational institution (e.g., college, school or university), and a group (e.g., an online group, hosted by the social network service, or some other third party server system, or, a real-world organization, such as a professional organization.) The edges that connect any two nodes can represent a wide variety of different associations or relationships. For example, in general, an edge may represent a relationship, an affiliation, an activity or event, or some other affinity shared in common between two entities. Although not exhaustive, the various associations presented in the table of FIG. 3 represent some of the many associations that may be mapped to the edges of a social graph data structure to indicate the association between entities in a social graph of a social network service, consistent with some embodiments of the invention.

Figure 4:
FIG. 4 is a user interface diagram showing an example of a message or content publishing interface via which an authorized representative of a company can generate a message, or otherwise specify some content, to be communicated to members of a social network service, consistent with embodiments of the invention.

FIG. 4 is a user interface diagram showing an example of a content or message publishing interface 80 via which an authorized representative of a company can generate a message, or otherwise specify some content, to be communicated to members of a social network service, consistent with embodiments of the invention. The portion of the user interface shown in FIG. 4 may, for example, be presented within any one of a number of user interfaces or web pages accessible to an authorized administrator or representative of an organization. For example, the interface for the content or message publishing module may be presented in an administrator's or representative's view of a company page, a products and/or services page, a page for a specific product or service, or some other administrative interface.

The interface of the content or message publishing module 80 allows an administrator or representative of a company to author a message or specify some other content for publication to one or more members of the social network service via the location-aware content server module. In this context, publication means that the message will become available for presentation and viewing by a member, but actual presentation to the member will depend upon the member being in a particular location associated with the content. As shown in the example interface of FIG. 4, at least with some embodiments, the representative can select a specific content type to which a message relates. For example, in FIG. 4, via the user interface element with reference number 82, a job listing (content type) has been selected for publishing. A wide variety of other content types might also be selected. Examples include: news articles, messages, product or service information, promotional offerings, company profile information including financial information, maps, parking information, information enabling access to network and computer resources, and so forth.

After selecting a content type 82, with some embodiments, a content identifier or uniform resource locator (URL) for some existing content is selected. In the example of FIG. 4, the content identifier 84 specifies a particular job listing, which may for example, be hosted at a job listing service operated by the social network service. Although not shown, in addition to selecting a content type and some specific content, a representative of the organization on whose behalf the content is being published can select which, if any member-interest buttons are to appear with the content when the content is presented via the mobile application on the mobile computing device. A member-interest button (e.g., a "like" button, a "+1"buttons, a "I want this product" button, and so forth) is a user interface element that enables a member to express some thought or feeling toward the content. The default settings may specify both the number and type of member-interest buttons that are to be presented, if any, with a particular type of content.

In addition to specifying the product and the member-interest buttons to appear with the message, the representative is presented with an input box 86 via which the representative can input the text of a message. In addition to providing some text, the representative or message author may share a link to some other content, as illustrated in FIG. 4 in connection with reference number 88. When the author provides the link, the content associated with the link, or some portion thereof, is automatically retrieved and inserted into the message.

Finally, a separate user interface element (e.g., a button or link) 89 provides the author with the option of specifying who should receive the message or status update when published. In this example, the author can select "All Followers" to have all followers of the company receive the location-based message, or the author can select to have a "Targeted Audience" receive the location-based message. In other instances, the author may opt to have all members of the social network service receive the location-based message.

Figure 5:
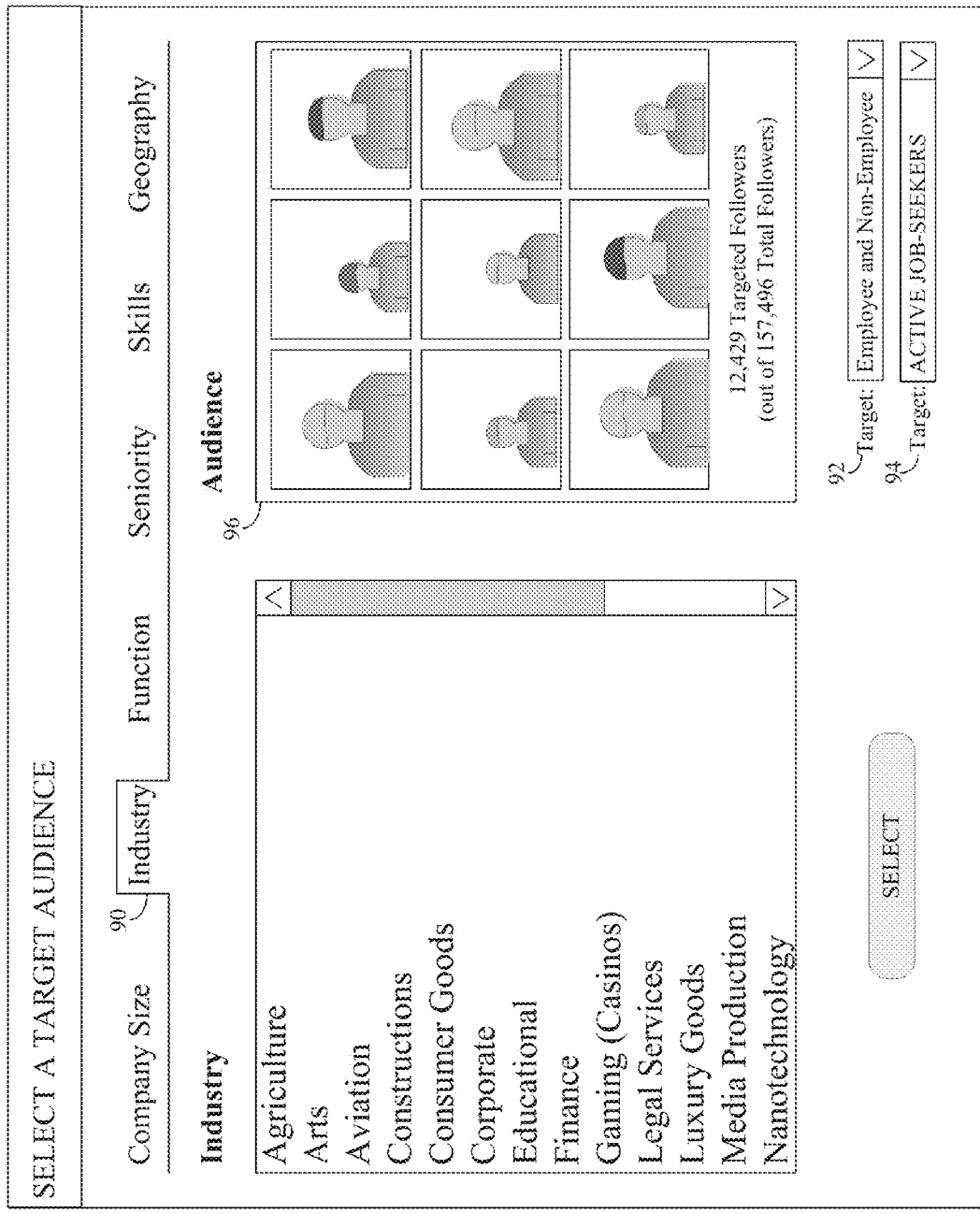
FIG. 5 is a user interface diagram showing an example of a member targeting interface via which an authorized representative of a company can specify member targeting criteria that will determine which members of a social network service receive certain content communicated or published on behalf of the company, consistent with some embodiments of the invention.

When the authorized representative of the organization on whose behalf some content is being published selects to have some content communicated to a targeted audience, the representative may be presented with a user interface for a member targeting module 52, similar to that shown in FIG. 5. In the example user interface of FIG. 5, the representative (author of the content or message) is presented with several categories of member profile attributes, including: Company Size, Interest, Function, Seniority, Skills, and Geography. By selecting the tab associated with a particular category of member profile attribute, the author will be presented with a user interface enabling the author to select various member profile attributes as targeting criteria for selecting an intended audience of the published content. In the example of FIG. 5, the currently selected tab corresponds with the "Industry" category 90. Accordingly, the representative can select one or more industries in which members are employed, as targeting criteria, for the content being published. As shown with reference number 92, the representative may select to have the content published and viewable by both employees and non-employees of a company, employees only, or non-employees. Similarly, as shown with reference number 94, with some embodiments, the representative can target members based on their job-seeking propensity. By selecting members who have certain member profile attributes, the author of the location-based content can tailor its message to a very specific audience likely to be receptive to receipt of any such content.

As the representative selects various member profile attributes, the portion of the user interface with reference number 96 is automatically updated to show member information (e.g., profile photographs, and/or names) of a subset of the members of the social network service who will receive the content, if and when the members are present in the location associated with the location-based content. Additionally, the size of the targeted audience, based on the currently selected member targeting criteria, is displayed. For instance, in the example of FIG. 5, based on the currently selected member targeting criteria, 12,429 members of the social network service will be eligible to receive the published content.

With some embodiments, the content specified or otherwise provided via the example user interface of FIG. 4 may automatically be associated with one or more geo-locations as previously determined for the particular organization on behalf of which the content is being published. Alternatively, as part of the user interface of FIG. 4, or as a separate user interface, a user interface may enable an authorized representative to select or otherwise specify geo-location information, including a geo-fence—a virtual perimeter for a real-world geographical area—to be associated with the content.

Figure 6:
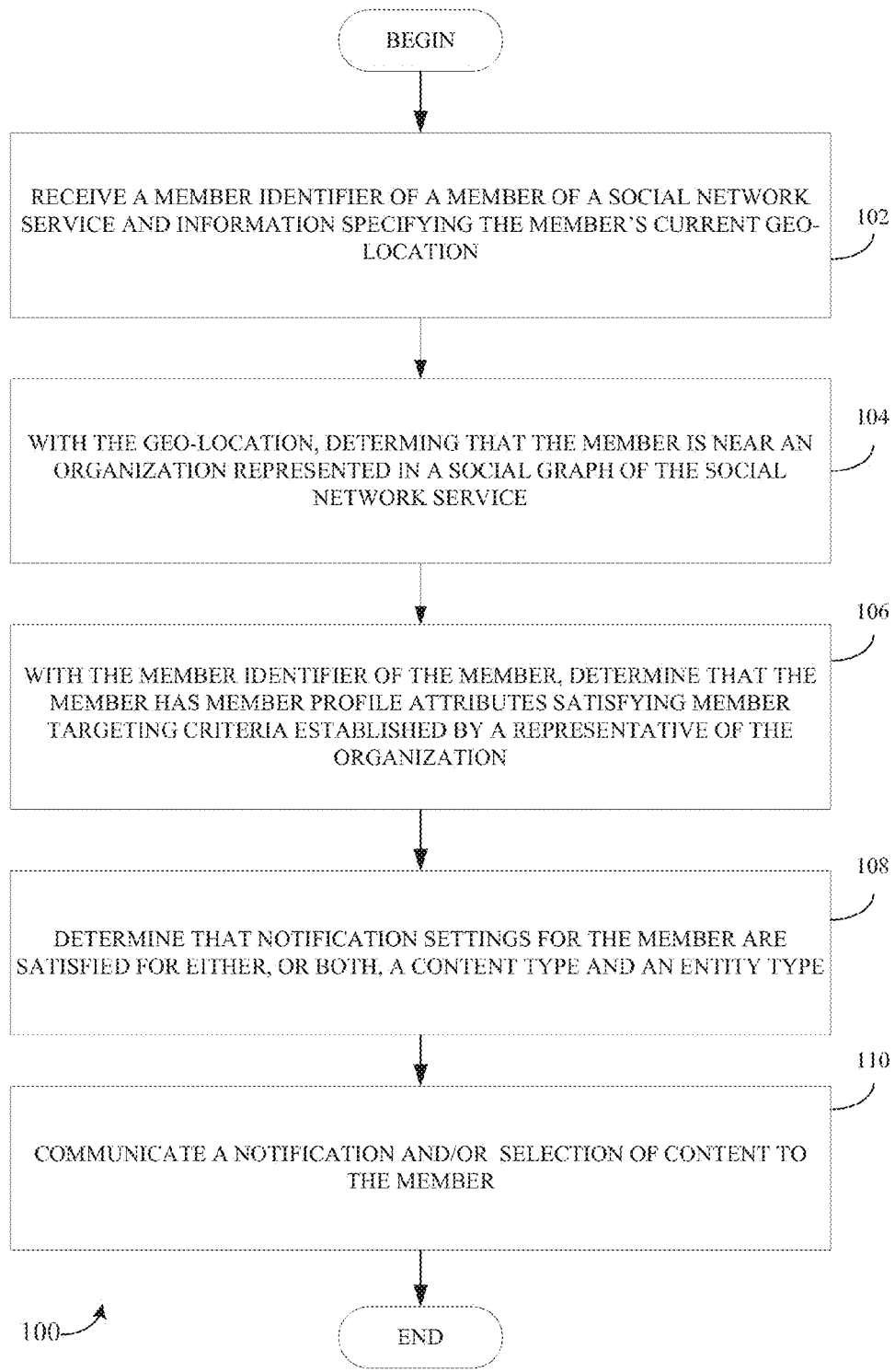
FIG. 6 is a flow diagram illustrating the processing operations that occur during a method for delivering or presenting content to a member of a social network service based in part on the member's geo-location, notification settings, and member targeting criteria specified by an authorized representative of a company on behalf of which the content is being communicated, consistent with some embodiments of the invention.

FIG. 6 is a flow diagram illustrating the processing operations that occur during a method 100 for delivering or presenting content to a member of a social network service based in part on the member's geo-location, notification settings, and member targeting criteria specified by an authorized representative of a company on behalf of which the content is being communicated, consistent with some embodiments of the invention. At method operation 102 a location-aware content server module of a social network service receives a message or request including a member identifier that uniquely identifies a member of the social network service and a geo-location of the member, as determined by a location sensing device that is part of the member's mobile computing device.

At method operation 104, using the received geo-location, the location-aware content server module determines that the member is in the proximity of an organization that is represented in the social graph of the social network service. Next, at method operation 106, using the member's member identifier, the location-aware content server module determines that the member has member profile attributes that satisfy member targeting criteria specified by a representative of the organization and associated with some specified content having a particular content type. At method operation 108, the location-aware content server module determines that the member's notification settings for the mobile application are satisfied in view of the type of content, and the type of organization. Finally, at method operation 108, a notification and/or the selection of content are communicated to the mobile computing device of the member for presentation to the member.

Figure 7:
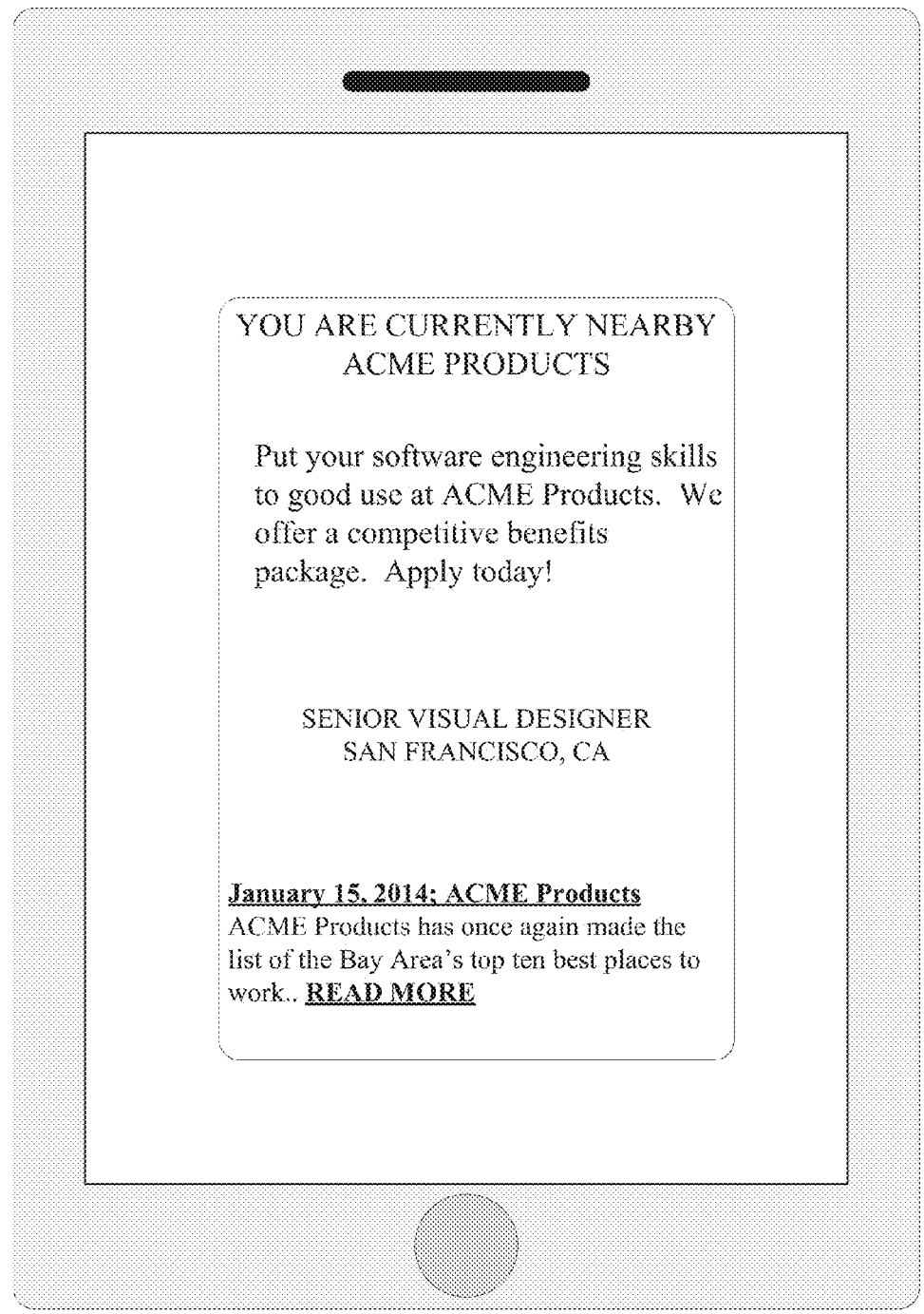
FIGS. 7 and 8 are user interface diagrams illustrating examples of user interfaces with content presented via a mobile computing device based at least in part on the geo-location of the mobile computing device, consistent with embodiments of the invention.
Figure 8:
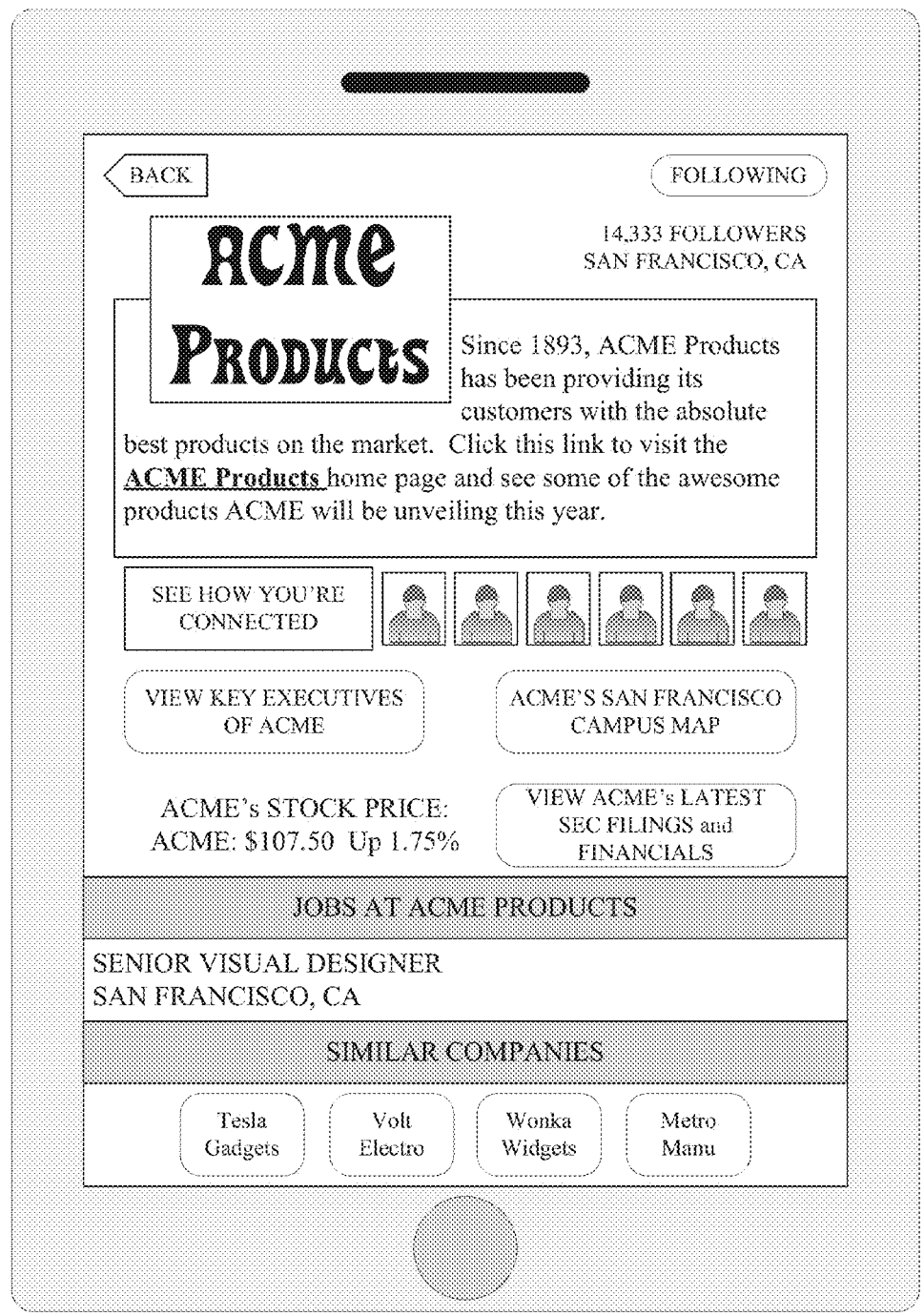
Figure 9:
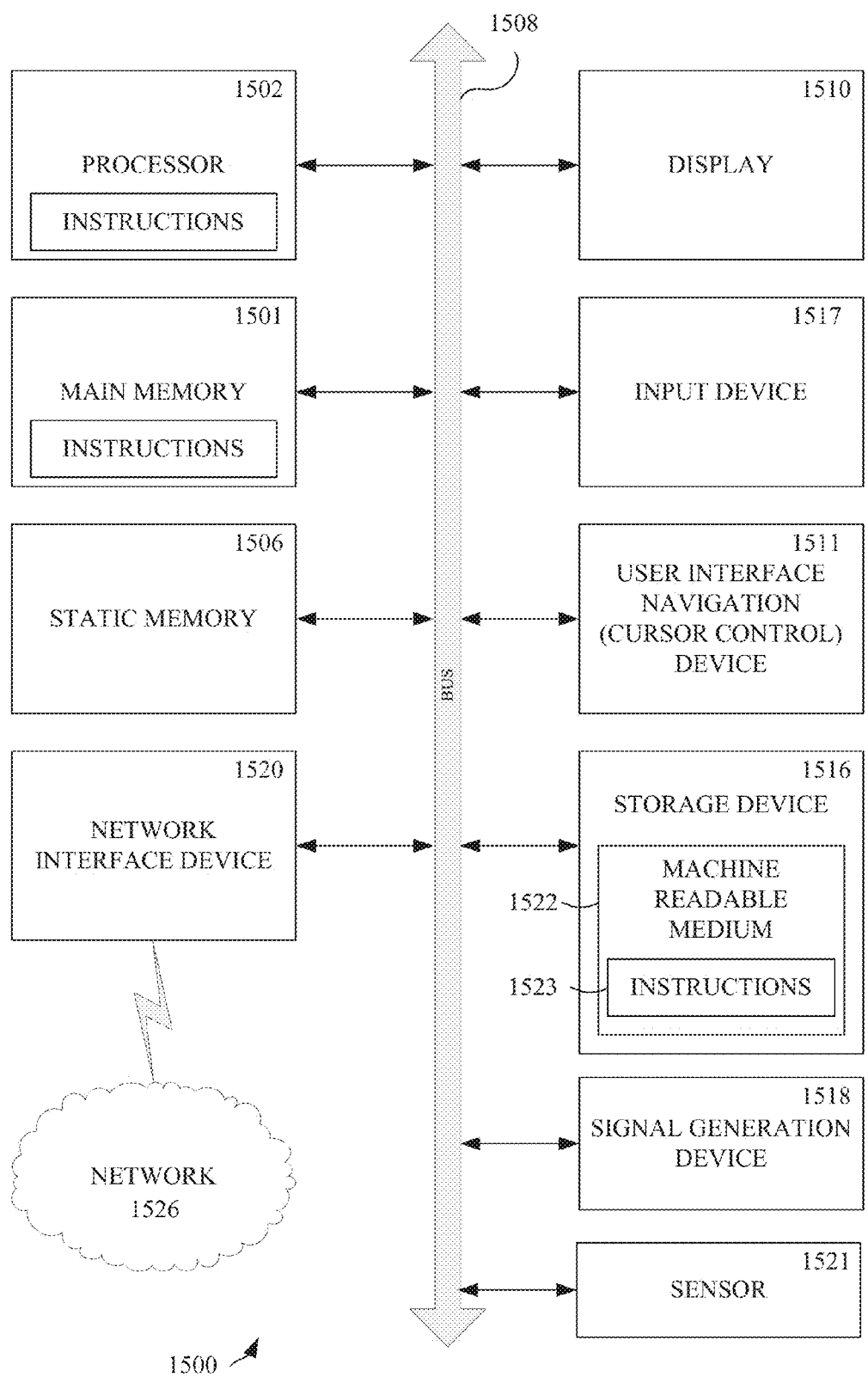
FIG. 9 shows a diagrammatic representation of a machine in the example form of a computer system within which a set of instructions when executed may cause the machine to perform any one or more of the methodologies discussed herein.

FIGS. 7 and 8 are user interface diagrams illustrating examples of user interfaces with content presented via a mobile computing device based at least in part on the geo-location of the mobile computing device, consistent with embodiments of the invention. FIG. 7 shows an example of a notification received at a mobile computing device, as a result of a member having member profile attributes that satisfy member targeting criteria specified by an authorized representative of an organization. The notification has been received, at least in part, because the member is located at or near a location selected by the representative of the organization.

FIG. 8 shows an example of a user interface diagram including various information from a company profile, and information relating the recipient to his or her social graph. For instance, in the example user interface of FIG. 8, the content recipient is presented with information identifying how the recipient is connected via a social graph of the social network service to other members of the social network service who are employees of the company.

Consistent with embodiments of the invention, a variety of different types of mobile applications can request information from a social network service, where the request for information includes the member's current geo-location. Accordingly, a location-aware content distribution module of the social network service can convey to members of the social network service relevant insightful information derived from analyzing the social graph of the social network service. For example, a mobile calendar application may make a content request prior to a planned calendar event (e.g., a meeting) that is to occur at a company. Based on a determination that the member is currently on a particular campus of the company, the location-aware content module can present to the member relevant information about the company, and specifically the particular campus at which the member is currently located. This information may include relevant profile information of the company, to include a campus map, financial information about the company, key employees of the company, and so forth. The information may also include member profile information of employees of the company who are also members of the social network service. For example, the information may include certain member profile information (or, links to member profile web pages) for key employees of the company, and/or employees of the company with whom the member is connected or otherwise associated, as evidenced in the social graph of the social network service.

In some instances, the particular content that is selected for presentation to the member is based not only on the member's current location, but also based on there being an association, connection or relationship between the member and another entity in the social graph to which the content relates. Furthermore, with some embodiments, content may only be presented to the member when the strength of the association, connection or relationship, as evidenced in the social graph of the social network service, meets or exceeds a threshold level. With some embodiments, the threshold levels may be configurable by the member, for example, as part of the notification settings for a particular mobile application. Furthermore, in some instances, the member may configure the notification settings on a per entity type basis.

For example, the member may configure the notification settings for a mobile application such that the member is only notified when the member is in proximity of a company (e.g., as an entity type) at which a certain (configurable) number of the employees are direct connections of the member. Similarly, the member may establish a notification setting to be notified when the member is near a company at which a certain (configurable) number of employees are alumni of the same school of which the member is an alumnus. In another example, a connection strength threshold may be dependent upon the number of people in the member's network (e.g., first degree connections, or first and second degree connections, etc.) who are following the entity (e.g., company), or are otherwise subscribed to receive messages published on behalf of the company, via the social network service. In yet another example, a notification setting may allow for a connection threshold to be established based on a connection or association with an employee of the entity, where the employee has a particular job title (e.g., Chief Executive Officer (CEO), Chief Financial Officer (CFO), General Counsel (GC), and so forth). With some embodiments, the association or connection strength thresholds are determined by default by the social network service, where in other instances, the settings may be manually configured.

The exact nature of the content that may be selected for presentation to the member will generally be dependent upon the member being in proximity with a particular entity represented in the social graph of the social network service, but will otherwise vary from one implementation to the next. Several examples of the type of content that may be presented are described immediately below. In one example, the information presented may be company profile information as maintained at the social network service. Such information may include: a textual summary or overview describing a company; financial information of a company; a current stock price of a company; a campus map of a company; and, information describing a product or service of a company.

In another example, the information presented may be specifically dependent upon there being an association, connection or relationship between the member (to whom the information is being presented) and another entity (member, company, school, organization, etc.) in the social graph. For example, the types of social graph data that may be presented include, but are certainly not limited to: member profile information of one or more members of the social network service whom, based on their member profile information, are currently or were previously employed at the company and with whom the member is directly connected or with whom the member is following; member profile information of one or more members of the social network service whom, based on member profile information, are currently employed at the company and are alumni of the same school of which the member is an alumnus; and, member profile information of one or more members of the social network service whom, based on member profile information, are currently employed at the company and are members of the same online group or community of which the member is also a member.

In yet another example, the content presented to the member via the mobile computing device may be selected based on the content having a relationship with the specific entity with which the member is proximate, and the content meeting or exceeding a threshold matching score derived by a recommendation or matching engine. For example, a job recommendation engine may analyze attributes of a job listing posted to a job listing service in view of a member's member profile information and a member's intent, as derived by analyzing the member's activity and behavior with respect to various applications, content and services of the social network service. Based on this analysis, the job recommendation engine may identify a particular job listing of a company that is likely to be of interest to the member. If and when the member is near the company, the member may be notified, via a mobile computing device, of the particular job listing associated with the company. Other advantageous aspects of the present inventive subject matter will be apparent from the description of the figures that follows.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

FIG. 8 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    receiving a member identifier of a member of a social network service and information specifying a current geo-location of a mobile computing device of the member of the social network service;
    using the current geo-location, analyzing a social graph of the social network service to determine that the mobile computing device is in geographical proximity of an organization that is represented in the social graph of the social network service and that the member associated with the member identifier has a connection or association with the organization, as indicated in the social graph of the social network service, and that a strength of the connection or association meets or exceeds a predefined threshold for an entity type of the organization; and communicating a notification to the member of the social network service to notify the member of the member's geographical proximity with the entity.

2. The method of claim 1, wherein determining that the mobile computing device is in geographical proximity of the organization that is represented in the social graph of the social network service includes comparing the information specifying the current geo-location of the mobile computing device with geo-location information of the organization stored as part of the profile of the organization.

3. The method of claim 1, wherein the predefined threshold is configurable by the member.

4. The method of claim 1, wherein the predefined threshold is configurable on a per entity type basis.

5. The method of claim 1, wherein the organization is a company and determining that the member associated with the member identifier has a connection or association with the organization and that the strength of the connection or association meets or exceeds a predefined threshold includes determining that the member is following the company or has otherwise subscribed to receive messages published on behalf of the company.

6. The method of claim 1, wherein the organization is a company and determining that the member associated with the member identifier has a connection or association with the organization and that the strength of the connection or association meets or exceeds a predefined threshold level includes determining that the member is directly connected with at least a predetermined number of other members of the social network service who, based on information in their member profiles, are currently employed at the company.

7. The method of claim 1, wherein the organization is a company and determining that the member associated with the member identifier has a connection or association with the organization and that the strength of the connection or association meets or exceeds a predefined threshold includes determining that at least a predetermined number of other members of the social network service who, based on information in their member profiles, are currently employed at the company are alumni of a school of which the member is also an alumnus.

8. The method of claim 1, wherein the organization is a company and determining that the member associated with the member identifier has a connection or association with the organization and that the strength of the connection or association meets or exceeds a predefined threshold includes determining that at least a predetermined number of other members of the social network service who, based on information in their member profiles, are currently employed at the company are members of an online group or community of which the member is also a member.

9. The method of claim 1, wherein the organization is a company and determining that the member associated with the member identifier has a connection or association with the organization and that the strength of the connection or association meets or exceeds a predefined threshold includes determining that the member is following or is directly connected to one or more other members of the social network service who, based on information in their member profiles, are currently employed at the company and have a specific job title.

10. The method of claim 1, wherein the organization is a company, the method further comprising:

causing profile information of the company to be presented via the mobile computing device, the profile information including any one or more of the following: a textual summary or overview describing the company; financial information of the company; a current stock price of the company; a campus map of the company; and, information describing a product or service of the company.

11. The method of claim 1, wherein the organization is a company, the method further comprising:

causing social graph information of the member to be presented via the mobile computing device, the social graph information including any one or more of the following: member profile information of one or more members of the social network service whom, based on their member profile information, are currently or were previously employed at the company and with whom the member is directly connected or with whom the member is following; member profile information of one or more members of the social network service whom, based on member profile information, are currently employed at the company and are alumni of the same school of which the member is an alumnus; and, member profile information of one or more members of the social network service whom, based on member profile information, are currently employed at the company and are members of the same online group or community of which the member is also a member.

12. The method of claim 1, wherein the organization is a company, the method further comprising:

causing a news article about the company to be presented via the mobile computing device, the news article selected for presentation based on a news recommendation engine identifying that the news article has been shared by a number of members of the social network service that exceeds a threshold, commented on by a number of other members of the social network service that exceeds a threshold, or some combination thereof.

13. The method of claim 1, further comprising:

identifying a message or status update that relates to the organization and that has been published to an activity stream by another member of the social network service with whom the member is associated or has a relationship, as indicated in the social graph of the social network service; and causing the message or status update to be presented via the mobile computing device.

14. The method of claim 1, further comprising:

identifying a message or status update that relates to the organization and on which another member with whom the member is associated or has a relationship, as indicated in the social graph of the social network service, has commented; and causing the message or status update to be presented via the mobile computing device.

15. The method of claim 1, further comprising:

identifying a message or status update that relates to the organization and for which another member with whom the member is associated or has a relationship, as indicated in the social graph of the social network service, has selected a member-interest button to express an interest in, or, favorable opinion about; and causing the message or status update to be presented via the mobile computing device.

16. The method of claim 1, further comprising:
with a job recommendation engine, determining that the member has member profile attributes that satisfy requirements of a job listing posted to a job listing service by an authorized representative of the organization; and
causing the job listing to be presented via the mobile computing device.

* * * * *